United States Patent

Machuron-Mandard et al.

Patent Number: 5,830,342
Date of Patent: Nov. 3, 1998

[54] PROCESS FOR THE ELECTROCATALYTIC REDUCING DISSOLVING OF REFRACTORY COMPOUNDS OF CERIUM

[75] Inventors: Xavier Machuron-Mandard, Massy; Laurent Audubert, Saint Quentin; Laurent Thouin, Antony, all of France

[73] Assignee: Commissariat a l'Energie Atomique, Paris, France

[21] Appl. No.: 754,550

[22] Filed: Nov. 21, 1996

[30] Foreign Application Priority Data

Dec. 13, 1995 [FR] France ................... 95 14745

[51] Int. Cl.$^6$ ................... C01C 1/18
[52] U.S. Cl. ............ 205/687; 205/766; 205/767
[58] Field of Search ............ 205/687, 766, 205/767

[56] References Cited

U.S. PATENT DOCUMENTS

| | | | |
|---|---|---|---|
| 3,812,233 | 5/1974 | Duncan | 423/21 |
| 4,417,965 | 11/1983 | Inoue | 204/164 |
| 4,869,794 | 9/1989 | Koehly et al. | 204/766 |
| 4,908,108 | 3/1990 | Horbez et al. | 204/93 |
| 5,420,088 | 5/1995 | Silva et al. | 502/22 |
| 5,516,972 | 5/1996 | Farmer et al. | 588/210 |

FOREIGN PATENT DOCUMENTS

| | | |
|---|---|---|
| 0089185 | 9/1983 | European Pat. Off. |
| 0332512 | 9/1989 | European Pat. Off. |
| 1592115 | 1/1971 | Germany |
| 862613 | 3/1961 | United Kingdom |

OTHER PUBLICATIONS

WPI Accession No. 91–34813/32 & JP 3153520A (Sumitomo) no date available.

Gazz. Chim. Ital. 37(a), pp. 51–54 (1907), L. Marino no month available.

Primary Examiner—Arun S. Phasge
Attorney, Agent, or Firm—Pearne, Gordon, McCoy & Granger LLP

[57] ABSTRACT

The invention relates to an electrocatalytic or aero-electrocatalytic process for the reducing dissolving of a refractory compound of cerium such as $CeO_2$. According to this process, the compound to be dissolved is introduced into an aqueous acid solution, e.g. a sulphuric solution, containing an electrochemical carrier constituted by one of the reducing or oxidizing species of a redox pair, whose redox potential is below +1.25 V/SHE, e.g. a ferric salt, a uranyl salt, molecular iodine or oxygen, and continuous generation and/or regeneration takes place by electrolysis of the reducing species of said redox pair.

13 Claims, 1 Drawing Sheet

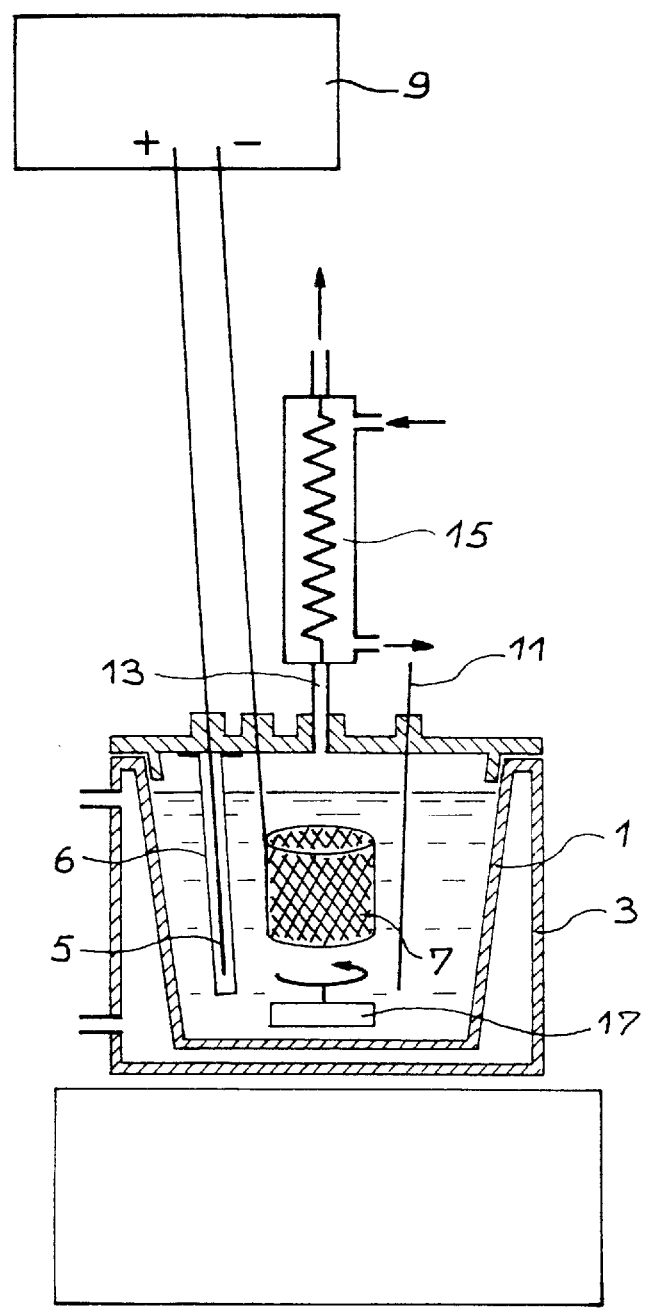

PROCESS FOR THE ELECTROCATALYTIC REDUCING DISSOLVING OF REFRACTORY COMPOUNDS OF CERIUM

DESCRIPTION

The present invention relates to a process for dissolving a refractory compound of cerium, which is difficult to dissolve in an aqueous medium, such as cerium dioxide.

It more particularly applies to the dissolving of any cerium dioxide matrix used as an inert support for chemical elements intended for the production of energy, especially nuclear energy. Matrixes of this type can be constituted by single-phase, mixed oxide targets $(Ce,Pu)O_2$, or more generally single-phase systems of the type $(Ce,An)O_2$, in which An is an element from the series of actinides, particularly a transuranium element, such as neptunium or americium.

It also applies to the dissolving of cerium dioxide used as a pure or doped material in the standard chemical industry.

It is known that cerium dioxide $CeO_2$ is one of the most refractory materials on dissolving in an acid medium. Thus, thermodynamic calculations carried out for its dissolving in a non-complexing acid medium, e.g. in perchloric acid, unambiguously demonstrate that it impossible to solubilize this material by the sole action of an acid, because the standard free enthalpy variation of the corresponding reaction:

$CeO_{2(solid)} + 4\ H^+_{(aqueous)} \rightarrow Ce^{4+}_{(aqueous)} + 2\ H_2O_{(liquid)}$ is 46.8 kJ/mole.

This positive free enthalpy variation demonstrates the thermodynamically impossible character of this dissolving. However, it is possible to solubilize $CeO_2$ by the action of hot, concentrated sulphuric acid by converting it by metathesis into ceric sulphate $Ce(SO_4)_2$, which can subsequently be taken up by water and solubilized in this way.

It is also possible to solubilize the cerium oxide by reducing dissolving in an acid medium using reducers such as hydrogen peroxide, hydroiodic acid, stannous chloride, hydroquinone and nascent hydrogen, as is described by P. Pascal in Nouveau Traité de Chimie Minérale, VII, vol. 2, Masson, 1959, p 790 and L. Marino in Gazz. Chim. Ital., 37(1), 1907, pp 51–54.

The main disadvantage of this reducing dissolving is that it requires the use of a stoichiometric quantity of reducing agent for dissolving all the $CeO_2$. This can inter alia lead to the handling of large quantities of reagents, the storage thereof and to the corresponding safety problems. This more particularly applies in the case of hydrogen peroxide which, like a large number of peroxides, constitutes a recognized potential danger because the solutions conventionally used in industry, whose peroxide concentration often exceeds 30 wt. %, must be very carefully handled because in the presence of in particular metallic impurities, an explosive reaction may be triggered. However, the dissolving of 1 kg of cerium dioxide requires the use of at least 0.330 kg of 30% hydrogen peroxide solution.

In the case of other inorganic reducing agents, it is the quantitative addition of mineral salts to the solution which can be a handicap. Thus, although the addition of reducing reagents in a stoichiometric quantity is effective from the reactivity standpoint, the use of such reagent quantities must be proscribed in certain cases, particularly when the added reagents are liable to give rise to increased corrosion as a result of the nature of the counterions used and/or a precipitation by saturation of the medium, or when they are formed by onerous compounds. Moreover, in the nuclear industry, the addition of large quantities of reagents must be avoided, because it increases the mass of radioactive effluents produced, whose control is already sufficiently problematical and onerous. However, the complexity and consequently the processing costs for such waste can inter alia be increased by their saline charge.

The object of the present invention is a process for the reducing dissolving of a refractory compound of cerium such as cerium dioxide, which obviates these disadvantages by limiting the reducing agent quantity added to the dissolving solution.

According to the invention, the process for dissolving a refractory compound of cerium consists of introducing said compound into an aqueous acid solution incorporating an electrochemical carrier constituted by one of the reducing or oxidizing species of a redox pair, whose redox potential is below +1.25 V/SHE (standard hydrogen electrode) and subjecting the aqueous solution to electrolysis in order to continuously generate and/or regenerate the reducing species of the redox pair.

According to this process, the reducing dissolving of the cerium compound such as $CeO_2$ corresponds to the following reaction diagram:

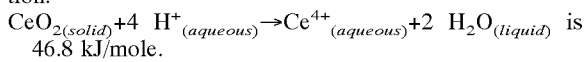

in which x and y depend on the nature of the chosen redox pair.

When hydrogen is used as the reducer, said reaction can be written:

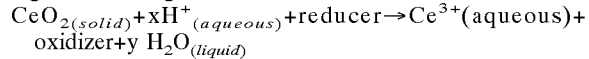

The standard free enthalpy variation corresponding to this reaction is –121 kJ/mole. This value is equivalent to a standard redox potential for the $CeO_2/Ce^{3+}$ pair of +1.25 V relative to the standard hydrogen electrode (SHE).

This standard redox potential determination makes it possible to choose reducing agents able to reduce $CeO_2$. Thus, in the invention it is possible to use any redox pair, whose standard potential is below +125 V/SHE.

The invention makes use of a limited amount of an electrochemical carrier constituted by one of the oxidizing or reducing species of the redox pair by continuously generating and/or regenerating the reducing species of said pair by electrolysis.

For performing the process according to the invention, it is possible to introduce the electrochemical carrier into the reaction medium dissolved in aqueous solution, in solid form or in gaseous form. In all cases, the solution is electrolyzed in order to generate and/or regenerate the reducing species of the redox pair.

In the case where the electrochemical carrier is introduced in solution in a totally or partly soluble form, it can correspond to the oxidizing species or to the reducing species of the redox pair. If it is introduced in the form of the oxidizing species, the electrolysis firstly serves to generate the reducing species and then for regenerating the same during the dissolving reaction. When it is introduced in the form of the reducing species, the electrolysis is used solely for regenerating said reducing species during the reaction.

If the electrochemical carrier is introduced in the gaseous state, the electrolysis is used for continuously generating the reducing species employed for the reaction, which is e.g. the case with reducing species such as hydrogen peroxide, which can be continuously generated in the solution by electrolysis from oxygen e.g. resulting from the air introduced in the vicinity of the cathode.

The aqueous solution used in the process according to the invention is a solution of a mineral acid such as $H_2SO_4$, HCl, HBr, HI and $HClO_4$.

In general, use is made of a sulphuric acid solution containing e.g. 0.5 to 5 mole/l of $H_2SO_4$.

According to a first embodiment of the invention, the electrochemical carrier is dissolved in the solution in a catalytic quantity.

In the said first embodiment, the reducing species can be generated by electrolysis and continuously regenerated during the dissolving reaction. It is consequently unnecessary to use a large quantity of electrochemical carrier.

This reducing species can be chosen from among $Br^-$, $Pu^{4+}$, $Np^{4+}$, $Fe^{2+}$, $I^-$, $Fe(CN)_6^{4-}$, $VO^{2+}$, $U^{4+}$, $Sn^{2+}$, $Np^{3+}$, $Ti^{3+}$, $V^{2+}$, $Ti^{2+}$, $Cr^{2+}$, $Eu^{2+}$ and $U^{3+}$, It is possible to introduce such reducing species in the form of salts corresponding either to the reducing species or to the oxidizing species. In this case, the anion of the salt is preferably identical to that of the acid used.

As an example of an electrochemical carrier which can be dissolved in the solution, reference can be made to a ferric salt such as ferric sulphate, molecular iodine and a uranyl salt such as uranyl sulphate.

Generally, the electrochemical carrier concentration of the solution is $10^{-3}$ to $10^{-1}$ mole/l.

The electrochemical carrier used is chosen as a function of the kinetic properties of the carrier with respect to the electrochemical reaction for synthesizing the reducing species, as well as the kinetic properties of the reducing species with respect to the dissolving reaction of the oxide. This choice is also dependent on the chemical reactor used for dissolving, because it is necessary to avoid any corrosion risk with respect to the reactor construction materials as a result of said carrier.

According to a second embodiment of the invention, the electrochemical carrier is continuously introduced in the gaseous state into the solution and then the reducing species is continuously generated by electrolysis in the solution.

An example of such an electrochemical carrier is oxygen, which leads by electrolysis to the production of hydrogen peroxide in solution.

According to a third embodiment of the invention, the electrochemical carrier is continuously generated in the gaseous state in the solution by electrolysis thereof.

An example of such a reducing species is nascent hydrogen produced by electrolysis of the acid solution.

For implementing the process according to the invention, it is possible to work at ambient temperature or a higher temperature favouring the dissolving reaction. Temperatures of 20° to 100° C. can in particular be used.

In addition, the electrolysis parameters and in particular the current intensity applied to the cathode, are chosen so as to obtain an optimum generation and/or regeneration of the reducing species.

Generally, electrolysis is carried out by applying to the cathode a current density of $10^{-4}$ at $5.10^{-2}$ A/cm$^2$.

Preferably the aqueous solution is stirred and working takes place under an inert gas atmosphere such as nitrogen, except in the case where the presence of oxygen is necessary for generating the reducing species.

The process of the invention is applicable to the dissolving of cerium dioxide alone or other oxides, particularly to single-phase oxides of the type $(Ce,An)O_2$, in which An is an element from the series of actinides. It can also be applied to two-phase oxides of the type $(Ce,An)O_2$ resulting from the partial insolubilization of the actinide dioxide in the $CeO_2$ matrix due to an excessive actinide content. In this case, it is appropriate to choose a redox pair also permitting the dissolving of the $AnO_2$ phase.

Single or two-phase oxides of the type $(Ce,An)O_2$ can be encountered during the reprocessing of spent nuclear fuels or during the processing of oxide-contaminated waste. Thus, the process of the invention can be used for decontaminating them.

BRIEF DESCRIPTION OF THE DRAWING

Other features and advantages of the invention can be gathered from the following non-limitative and illustrative description with reference to FIG. 1, which diagrammatically shows an electrolyzer usable for performing the process according to the invention.

The electrolyzer comprises a container 1 surrounded by an enclosure 3 in which circulates a thermostatically controlled fluid in order to keep the electrolyzer 1 at the desired temperature.

The electrolyzer contains an anode 5 formed by an inert material such as platinum or graphite and a cathode 7 constituted by a hollow, platinum grid cylinder with an estimated geometrical surface of 43 cm$^2$. The anode 5 is placed in a separate anode compartment 6 having a porous wall, e.g. of sintered glass, permitting the passage of the electric current without significant mixing between the anode and cathode media. The anode 5 and cathode 7 are connected to a power generator 9, an inert or similar gas being introduceable into the electrolyzer 1 by the pipe 11 and is discharged by the pipe 13 which traverses a cooler 15. A magnetic stirrer 17 is also located within the electrolyzer.

The following examples illustrate the performance of the process of the invention in said electrolyzer.

EXAMPLE 1

Electrocatalytic Dissolving of the Cerium Dioxide by Fe(II)

Into the electrolyzer are introduced 200 ml of a 1 mole/l sulphuric acid solution containing 0.1 mole/l of ferric sulphate and to it is added 1 g of cerium dioxide having a B.E.T. specific surface of 150 m$^2$/g. The thermostatically controlled enclosure 3 is adjusted so as to maintain the temperature at 9020 C. The solution is also stirred and an inert gas constituted by nitrogen is bubbled on introducing it through the pipe 11. An intensity of 48.5 mA is applied to the cathode, which corresponds to a mean current density of 1.13 mA/cm$^2$.

After 3 h 15 min electrolysis, the dissolving rate is 100%, which corresponds to a faradic dissolving efficiency of 100%. The dissolving speed is constant at 0.308 g/h.

EXAMPLE 2

Electrocatalytic Dissolving of Cerium Dioxide by Fe(II)

The same operating procedure as in example 1 is followed for bringing about the electrocatalytic dissolving of the same cerium dioxide, except that to the cathode is applied an intensity of 300 mA, which corresponds to a mean current density of 7 mA/cm$_2$.

After 30 min electrolysis, the dissolving rate is 96% and the faradic dissolving efficiency 100%. The dissolving speed is constant at 1.92 g/h.

EXAMPLE 3

Electrocatalytic Dissolving of Cerium Dioxide by Fe(II)

The same operating procedure as in example 1 is followed, except that an intensity of 600 mA is applied to the cathode corresponding to a mean current density of 14 mA/cm$^2$.

Under these conditions, a dissolving rate of 96% is obtained after 15 min electrolysis, i.e. a faradic dissolving efficiency of 100%. The dissolving speed is constant at 3.84 g/h.

EXAMPLE 4

Electrocatalytic Dissolving of Cerium Dioxide by Fe(II)

This example follows the operating procedure of example 1, except that use is made of 1 g of cerium dioxide, which has previously been calcined at 1000° C. for 6 h and consequently has a specific B.E.T. surface of 15 m$^2$/g and to the cathode is applied an intensity of 300 mA corresponding to a mean current density of 7 mA/cm$^2$.

Under these conditions a dissolving rate of 96% is obtained after 30 min electrolysis, i.e. a faradic dissolving efficiency of 100%. The dissolving speed is constant at 1.92 g/h.

EXAMPLE 5

Electrocatalytic Dissolving of Cerium Dioxide by Fe(II)

This example follows the operating procedure of example 1 for dissolving 1 g of cerium dioxide having a specific B.E.T. surface of 150 m$^2$/g, but operating at a temperature of 50° C. and applying to the cathode an intensity of 300 mA, which corresponds to a mean current density of 7 mA/cm$^2$.

Under these conditions a dissolving rate of 96% is obtained after 30 min electrolysis, i.e. a faradic dissolving efficiency of 100%. The dissolving speed is constant at 1.92 g/h.

A comparison of the results of examples 1 to 3 shows that the dissolving speed increases with the current intensity applied to the cathode, the faradic dissolving efficiency being in all cases 100%.

A comparison of the results of examples 2 and 4 demonstrates that the specific surface of the cerium dioxide has no influence. Thus, on using a cerium dioxide with a smaller specific surface, the dissolving speed is not modified, the dissolving rate being the same after 30 min electrolysis in both cases.

In the same way, a comparison of the results obtained in examples 2 and 5 shows that the temperature does not influence the dissolving rate.

This confirms the nature of the kinetically limiting stage of the reaction, which is the electroreduction reaction of Fe (III) at the electrode. Thus this process is limited by the diffusional supply of Fe$^{3+}$ ions to the cathode, this phenomenon only being slightly thermally activated. The effect of the temperature of the medium on the dissolving kinetics is consequently low and was not observed. In the same way, the specific surface of the oxide powder has no significance with respect to the result, as can be gathered from examples 2 and 4. This parameter is largely dependent on the calcining undergone by the oxides during the synthesis processes or during their use is preponderant and often of a handicapping nature during the performance of conventional chemical reactions for which, consequently, the oxides calcined at high temperature are very often more difficult to dissolve. The process of the invention obviates this disadvantage, because there is no difference as a function of the oxide calcining state.

COMPARATIVE EXAMPLE 1

In this example an attempt is made to dissolve 0.343 g of cerium dioxide having a B.E.T. specific surface of 150 m$^2$/g by reacting with a non-complexing mineral acid, namely perchloric acid, using 200 ml of a 1 mole/l perchloric acid solution, kept at a temperature of 50° C. Fluidization of the suspension is maintained by stirring for 82 min, followed by progressive cooling to ambient temperature over a period 20 min. The insoluble cerium dioxide residue is separated from the supernatant solution by filtering on sintered glass, followed by drying in an oven at 400° C. for 2 h, cooling in the dryer on phosphoric anhydride and weighing.

In this way 0.344 g of cerium dioxide is recovered which, bearing in mind the precision of the measurements of the weights carried out, indicates the absence of dissolving of the cerium dioxide.

COMPARATIVE EXAMPLE 2

In this example an attempt is made to dissolve cerium dioxide by the action of another weak complexing mineral acid for cerium in the form of sulphuric acid. To this end, 0.366 g of cerium dioxide with a B.E.T. specific surface of 150 m$^2$/g is introduced into 200 ml of a 1 mole/l sulphuric acid solution kept at 50° C. Fluidization of the suspension is maintained for stirring for 3.5 h, followed by progressive cooling to ambient temperature over 20 min. The insoluble residue is recovered by filtration and a slightly yellow, supernatant solution is obtained. This colouring is probably due to the presence of tetravalent cerium resulting from the partial dissolving of the cerium oxide.

Spectrophotometric analysis of the total cerium in solution (trivalent and tetravalent cerium) shows that the dissolving rate of the cerium dioxide is 1.09%.

The measurement of the redox potential of the solution during the reaction shows that this solubilization takes place in the first instants of contact between the oxide and the acid solution. When the solution has reached a potential of approximately 1.4 V/SHE, a potential stabilization is obtained, which indicates the stoppage of dissolving. This stoppage was observed roughly 30 min following the addition of oxide to the medium.

The initial dissolving speed is 0.0079 g/h, which is equivalent to a standardized initial speed with respect to the B.E.T. surface of the oxide of $1.45 \cdot 10^{-4}$ g.m$^{-2}$·h$^{-1}$.

Thus, comparative examples 1 and 2 show that in the absence of reducing agent generated or regenerated by electrolysis, it is impossible to dissolve the cerium dioxide.

EXAMPLE 6

Electrocatalytic Dissolving of Cerium Dioxide by I$^-$

The same operating procedure as in example 1 is adopted for dissolving 1 g of cerium dioxide having a B.E.T. specific surface of 150 m$^2$/g using 200 ml of a 1 mole/l sulphuric acid solution containing 1.25 mmole/l of molecular iodine and kept at 90° C. The system is stirred, but no degassing takes place to avoid distillation of the iodine. The current intensity applied to the cathode is 48 mA, which corresponds to a mean current density of 1.1 mA/cm$^2$.

After 6 h 50 min electrolysis, there is a solubilization rate of 91% corresponding to a dissolving speed of 0.14 g/h and a faradic efficiency of 45%.

EXAMPLE 7

Electrocatalytic Dissolving of Cerium Dioxide by I$^-$

The operating procedure of example 6 is followed, but a current intensity at the cathode of 14.7 mA is used corresponding to a mean current density of 0.34 mA/cm$^2$.

After 13 h 20 min electrolysis, the dissolving rate is 100% corresponding to a faradic dissolving efficiency of 79.4%. The dissolving speed is $7.5 \cdot 10^{-1}$ g/h.

On comparing the results obtained in examples 6 and 7 with those of example 1, it can be seen that iodine is a very interesting electrochemical carrier in many respects. Thus, with a carrier concentration (1.25 mmole/l) 100 times lower than in example 1 (1 mole/l), the dissolving speed is only twice lower than that obtained with iron.

This lower carrier content is due to the reduced solubility of $I_2$, but the iodine concentration can be increased by supersaturation or simply by saturation of the hot solution, because the solubility of iodine increases greatly with the temperature.

A comparison of examples 6 and 7 also shows that if interest is only attached to the faradic efficiency, the reduction of the current density by a factor of 2 makes it possible to raise said efficiency from 45% in example 6 to 79% in example 7. The effective dissolving speed is then also reduced by half.

The use conditions for iodine as the carrier can be greatly optimized and should make it possible to achieve high dissolving speeds associated with a faradic efficiency close to 100%. Therefore great interest is attached to iodine because, apart from its performance characteristics as a carrier, it can be subsequently eliminated from the reaction medium in very simple manner by distilling. The increase in the saline charge of the medium due to the addition of the carrier can consequently be brought to zero. It is also possible to recover the iodine for use again for dissolving other cerium oxide batches. In another field, the corrosion phenomena have been extensively studied with media containing iodide ions. The corrosion of stainless steels by such media would appear to be reduced, which is definitely an advantage. Finally, in the field of nuclear fuels, iodine is one of the fission products and consequently forms part of the elements already existing in the treated material and in the reaction medium. Thus, its use is not prejudicial.

EXAMPLE 8

Electrocatalytical Dissolving of Cerium Dioxide by U (IV)

The operating procedure of example 1 is followed for dissolving 0.362 g of cerium dioxide having a B.E.T. specific surface of 15 $m^2$/g in 70 ml of a 1 mole/l sulphuric acid solution containing 0.03 mole/l of uranyl sulphate kept at a temperature of 90° C.

Stirring of the system is maintained under a nitrogen atmosphere and to the cathode is applied an intensity of 50 mA corresponding to a mean current density of 1.2 mA/$cm^2$.

After 90 min electrolysis, the dissolving rate is 100%, which corresponds to a dissolving speed of 0.24 g/h for a faradic efficiency of 75%.

The use of uranium (IV) as the carrier is of interest, because it is possible to obtain a good faradic efficiency and a good dissolving speed using an element frequently encountered in the nuclear field.

EXAMPLE 9

Dissolving of Cerium Dioxide by Nascent Hydrogen

This example uses an electrolyzer, whose anode is placed in a central tube having a separate compartment and into the cathode compartment containing a volume of 200 ml of a 1 mole/l sulphuric acid solution kept at 90° C., is introduced 1 g of cerium dioxide having a B.E.T. specific surface of 150 $m^2$/g. Fluidization of the suspension is maintained by stirring under a nitrogen atmosphere and to the cathode is applied a current intensity of 48.5 mA corresponding a mean current density of 1.13 mA/$cm^2$.

After 45 h electrolysis, the dissolving rate is 90% corresponding to a faradic dissolving efficiency of 6.4% (ratio between the effective current used for dissolving and the total current supplied to the electrolyzer).

COMPARATIVE EXAMPLE 3

In this example an attempt is made to dissolve $CeO_2$ in the same solution as that used in example 9, by bubbling into said solution molecular hydrogen, which is not generated by electrolysis. Under these conditions there is no $CeO_2$ dissolving, which shows that a saturation of the medium by hydrogen is not active in this process.

It is assumed that in example 9, dissolving takes place by contact between oxide grains and the cathode, or by reaction with a volatile reducing entity such as nascent hydrogen. Thus, the result of example 9 shows the possibility of dissolving $CeO_2$ by means of nascent hydrogen or by direct electron transfer to the cathode. Nevertheless, it is shown that the dissolving procedure of example 9 is only very slightly effective if no redox carrier is present in solution. In example 9, which uses a contact-based reaction mechanism, the dissolving rate will also greatly depend on the reactor geometry and the collision frequency between the oxide grains and the cathode surface.

Reference can be made to another mechanism. Thus, the dissolving speed observed in example 9 is 0.02 g/h, which also corresponds to a standardized speed of $1.3 \cdot 10^{-4}$ g.$m^-$$_2 \cdot h^{-1}$, i.e. a result identical to that of comparative example 2.

It could therefore be assumed that the electrolysis makes it possible to maintain the redox potential of the solution at a sufficiently low level to bring about a direct action of the solution on the oxide. In addition, this reaction would only be slightly thermally activated, because the speeds observed at 50° and 90° C. are virtually identical.

EXAMPLE 10

Aero-Electrocatalytical Dissolving of Cerium Dioxide

This example follows the same operating procedure as in example 1 for dissolving 1 g of cerium dioxide having a specific B.E.T. surface of 150 $m^2$/g, but use is made of 200 ml of a 1 mole/l sulphuric acid solution kept at 90° C. and with no ferric sulphate addition. Air is bubbled into the solution in the vicinity of the cathode surface at a rate of approximately 15 l/h. The suspension undergoes magnetic stirring to keep the oxide fluidized and a current intensity of 48 mA is applied to the cathode corresponding to a mean current density of 1.1 mA/cm . After stirring for 13 h, there is a dissolving rate of 100% and a speed of 0.075 g/h, accompanied by a faradic efficiency of 24%.

In this example, formation takes place by electrolysis from atmospheric oxygen introduced into the solution, of hydrogen peroxide which serves as the reducing species, by bubbling in the vicinity of the cathode. Thus, very simple and uncomplicated reactive air is injected in the vicinity of the cathode in the form of small bubbles. The electroreduction of the oxygen contained therein, performed under the indicated conditions, leads to the formation of hydrogen peroxide without extending to the ultimate stage of the reduction, namely water. The hydrogen peroxide formed then diffuses up to the oxide and reacts therewith in order to dissolve it.

The faradic efficiency obtained in this example is only 24%. However, it can easily be optimized, as can the overall $CeO_2$ dissolving speed. This embodiment of the invention constituting a very interesting variant is called the aeroelectrocatalytic process.

We claim:

1. Process for dissolving a refractory compound of cerium, comprising the steps of introducing this compound into an aqueous acid solution incorporating an electrochemical carrier constituted by one of the reducing or oxidizing species of a redox pair, whose redox potential is below +1.25 V/SHE (standard hydrogen electrode) and subjecting the solution to electrolysis for continuously generating and/or regenerating the reducing species of the redox pair.

2. Process according to claim 1, wherein the electrochemical carrier is dissolved in the acid solution in a catalytic quantity.

3. Process according to claim 2, wherein the reducing species of the redox pair is $Br^-$, $Pu^{4-}$, $Np^{4+}$, $Fe^{2+}$, $I^-$, $Fe(CN)_6^{4-}$, $VO^{2+}$, $U^{4+}$, $Sn^{2+}$, $Np^{3+}$, $Ti^{3+}$, $V^{2+}$, $Ti^{2+}$, $Cr^{2+}$, $Eu^{2+}$ and $U^{3+}$.

4. Process according to claim 3, wherein the electrochemical carrier is a ferric salt, molecular iodine or a uranyl salt.

5. Process according to claim 2, wherein the electrochemical carrier concentration of the solution is $10^{-3}$ to $10^{-1}$ mole/l.

6. Process according to claim 1, wherein the electrochemical carrier is continuously introduced in the gaseous state into the solution, the reducing species being continuously generated in the solution.

7. Process according to claim 6, wherein the electrochemical carrier is oxygen.

8. Process according to claim 1, wherein the electrochemical carrier is nascent hydrogen produced by electrolysis of the solution.

9. Process according to claim 1, wherein the compound to be dissolved is a single-phase oxide of formula $(Ce,Pu)O_2$ or $(Ce,Np)O_2$.

10. Process according to claim 1, wherein the aqueous acid solution is a sulphuric, hydrochloric, hydrobromic, hydroiodic or perchloric acid solution.

11. Process according to claim 10, wherein the aqueous solution is a sulphuric acid solution containing 0.5 to 5 mole/l of $H_2SO_4$.

12. Process according to claim 1, wherein electrolysis takes place by applying to the cathode a current density of $10^{-4}$ at $5.10^{-2}$ A/cm².

13. Process according to claim 1, wherein the cerium compound is $CeO_2$ or a mixed oxide $CeO_2$—$AnO_2$ with An representing an element from the series of actinides.

* * * * *